(12) United States Patent
Weiher et al.

(10) Patent No.: US 11,597,794 B2
(45) Date of Patent: Mar. 7, 2023

(54) COATING COMPOSITIONS AND COATINGS PRODUCED THEREFROM WITH IMPROVED SOILING RESISTANCE AND (SELF-)CLEANING PROPERTIES AND USE THEREOF

(71) Applicant: BASF Coatings GmbH, Münster (DE)

(72) Inventors: Christian Weiher, Muenster (DE); Berthold Austrup, Muenster (DE); Andreas Janssen, Muenster (DE)

(73) Assignee: BASF Coatings GmbH, Münster (DE)

( * ) Notice: Subject to any disclaimer, the term of this patent is extended or adjusted under 35 U.S.C. 154(b) by 1137 days.

(21) Appl. No.: 16/303,857

(22) PCT Filed: May 18, 2017

(86) PCT No.: PCT/EP2017/062014
§ 371 (c)(1),
(2) Date: Nov. 21, 2018

(87) PCT Pub. No.: WO2017/202692
PCT Pub. Date: Nov. 30, 2017

(65) Prior Publication Data
US 2020/0317949 A1     Oct. 8, 2020

(30) Foreign Application Priority Data

May 24, 2016 (EP) .................................... 16171080

(51) Int. Cl.
| | | |
|---|---|---|
| C08G 18/67 | (2006.01) | |
| C08F 220/18 | (2006.01) | |
| B05D 7/00 | (2006.01) | |
| C08F 212/08 | (2006.01) | |
| C08F 220/06 | (2006.01) | |
| C08F 220/20 | (2006.01) | |
| C08G 18/10 | (2006.01) | |
| C08G 18/75 | (2006.01) | |
| C08G 18/77 | (2006.01) | |
| C08G 18/80 | (2006.01) | |
| C08K 5/00 | (2006.01) | |
| C08L 83/04 | (2006.01) | |
| C09D 133/06 | (2006.01) | |

(52) U.S. Cl.
CPC ............ *C08G 18/672* (2013.01); *B05D 7/53* (2013.01); *C08F 212/08* (2013.01); *C08F 220/06* (2013.01); *C08F 220/1804* (2020.02); *C08F 220/1806* (2020.02); *C08F 220/20* (2013.01); *C08G 18/10* (2013.01); *C08G 18/755* (2013.01); *C08G 18/778* (2013.01); *C08G 18/809* (2013.01); *C08K 5/0025* (2013.01); *C08L 83/04* (2013.01); *C09D 133/066* (2013.01); *C08L 2312/08* (2013.01)

(58) Field of Classification Search
CPC ....... C08G 18/778; C08L 75/04; C08L 83/06; C08L 83/14
See application file for complete search history.

(56) References Cited

U.S. PATENT DOCUMENTS

| | | |
|---|---|---|
| 4,598,131 A | 7/1986 | Prucnal |
| 6,268,440 B1 | 7/2001 | Kudo et al. |
| 6,589,659 B1 | 7/2003 | Imai et al. |
| 6,803,426 B2 | 10/2004 | Coleridge et al. |
| 8,519,055 B2 | 8/2013 | Marsh et al. |
| 9,120,916 B1 | 9/2015 | Swarup et al. |
| 9,187,670 B1 | 11/2015 | Schwendeman et al. |
| 2002/0082341 A1* | 6/2002 | Matsuno ................ C08G 18/63 524/589 |
| 2002/0103288 A1 | 8/2002 | Haubennestel et al. |
| 2003/0158326 A1* | 8/2003 | Lomas ..................... A61Q 1/02 524/588 |
| 2005/0182189 A1 | 8/2005 | Ohrbom et al. |
| 2006/0054053 A1 | 3/2006 | Masutani et al. |
| 2008/0045631 A1 | 2/2008 | Henn |
| 2010/0288963 A1 | 11/2010 | Mitina et al. |
| 2011/0015340 A1 | 1/2011 | Hashemzadeh |
| 2012/0302693 A1 | 11/2012 | Nahas et al. |
| 2014/0186621 A1* | 7/2014 | Popa ..................... C08G 18/61 428/339 |
| 2014/0329098 A1 | 11/2014 | Groenewolt et al. |
| 2015/0037590 A1* | 2/2015 | Groenewolt ............. B05D 7/53 427/407.1 |
| 2015/0291808 A1 | 10/2015 | Oya et al. |
| 2016/0200941 A1 | 7/2016 | Liu et al. |
| 2017/0355875 A1 | 12/2017 | Klein et al. |

FOREIGN PATENT DOCUMENTS

| | | |
|---|---|---|
| AU | 2012236734 B2 | 3/2014 |
| CA | 2685744 A1 | 11/2008 |

(Continued)

OTHER PUBLICATIONS

Jiang, et al., "Polymerization of Silicone Modified Acrylate Emulsion and Preparation of Self-Cleaning Exterior Wall Paint", Advanced Materials Research, vol. 168-170, Dec. 2010, pp. 2055-2059.
International Search Report for International Application No. PCT/EP2017/062014, dated Sep. 5, 2017, 2 pages.
European Search Report for EP Patent Application No. 16171080.1, dated Dec. 7, 2016, 3 pages.
Singh, et al., "Carbamylmethylated Melamines, Novel Crosshnkers for the Coatings Industry", Advanced Organic Coatings Science and Technology Series, vol. 13, 1991, pp. 193-207.

*Primary Examiner* — Robert C Boyle
(74) *Attorney, Agent, or Firm* — Armstrong Teasdale LLP

(57) ABSTRACT

Coating compositions and coatings with improved soiling resistance and (self-)cleaning properties are disclosed. The coating compositions and coatings may be nonaqueous coating compositions and may include at least one hydroxyl group-containing compound, at least one isocyanate group-containing compound having free or blocked isocyanate and silane groups, at least one catalyst for the crosslinking of the silane groups, and at least one alkoxysilyl-functional siloxane.

19 Claims, No Drawings

(56) References Cited

FOREIGN PATENT DOCUMENTS

| | | |
|---|---|---|
| CN | 1240810 A | 1/2000 |
| CN | 1270249 A | 10/2000 |
| CN | 1345904 A | 4/2002 |
| CN | 1742064 A | 3/2006 |
| CN | 101018826 A | 8/2007 |
| CN | 101970545 A | 2/2011 |
| CN | 102428145 A | 4/2012 |
| CN | 103910853 A | 7/2014 |
| CN | 104768746 A | 7/2015 |
| CN | 105273594 A | 1/2016 |
| CN | 105531337 A | 4/2016 |
| DE | 102005045228 A1 | 4/2007 |
| EP | 0008127 A1 | 2/1980 |
| EP | 0249201 A2 | 12/1987 |
| EP | 0273640 A2 | 7/1988 |
| EP | 0276501 A2 | 8/1988 |
| EP | 0348946 A1 | 1/1990 |
| EP | 0435464 A2 | 7/1991 |
| EP | 0245700 B1 | 8/1994 |
| EP | 0626888 A1 | 12/1994 |
| EP | 0692007 A1 | 1/1996 |
| EP | 0994117 A1 | 4/2000 |
| EP | 1273640 A2 | 1/2003 |
| EP | 1295914 B1 | 3/2006 |
| EP | 2308908 A1 | 4/2011 |
| JP | H05287239 A | 11/1993 |
| JP | H06312909 A | 11/1994 |
| JP | 2000080169 A | 3/2000 |
| JP | 2001262013 A | 9/2001 |
| KR | 20100118927 A | 11/2010 |
| WO | 1994022968 A1 | 10/1994 |
| WO | 1997012945 A1 | 4/1997 |
| WO | 9855548 A1 | 12/1998 |
| WO | 1999026994 A1 | 6/1999 |
| WO | 2001009260 A1 | 2/2001 |
| WO | 2001098393 A1 | 12/2001 |
| WO | 2005003340 A2 | 1/2005 |
| WO | 2007033786 A1 | 3/2007 |
| WO | 2008074489 A1 | 6/2008 |
| WO | 2008074490 A1 | 6/2008 |
| WO | 2008074491 A1 | 6/2008 |
| WO | 2009077181 A1 | 6/2009 |
| WO | 2010149236 A1 | 12/2010 |
| WO | 2011056555 A1 | 5/2011 |
| WO | 2012168014 A1 | 12/2012 |
| WO | 2012168079 A1 | 12/2012 |
| WO | 2014187972 A1 | 11/2014 |
| WO | WO-2016/202588 A1 | 12/2016 |

\* cited by examiner

COATING COMPOSITIONS AND COATINGS PRODUCED THEREFROM WITH IMPROVED SOILING RESISTANCE AND (SELF-)CLEANING PROPERTIES AND USE THEREOF

CROSS-REFERENCE TO RELATED APPLICATIONS

This application is a U.S. National Phase Application of PCT/EP2017/062014, filed May 18, 2017, which claims the benefit of priority to EP Application No. 16171080.1, filed May 24, 2016, the contents of which are hereby expressly incorporated by reference in their entirety.

The present invention relates to nonaqueous coating compositions comprising at least one hydroxyl group-containing compound, at least one isocyanate group-containing compound having free or blocked isocyanate and silane groups, at least one catalyst for the crosslinking of the silane groups, and at least one alkoxysilyl-functional siloxane.

PRIOR ART

Known from WO 08/74491, from WO 08/74490, from WO 08/74489, from WO09/077181 and from WO 10/149236 are coating compositions comprising hydroxyl group-containing compounds (A) and compounds (B) containing isocyanate groups and silane groups, with (B) being based on known isocyanates, preferably on the biuret dimers and isocyanurate trimers of diisocyanates, especially of hexamethylene diisocyanate. These coating compositions have the advantage over their conventional polyurethane counterparts of significantly improved scratch resistance in conjunction with good weathering resistance. The sandability and polishability of the coatings resulting from these coating compositions were optimized in WO 2012/168014 and WO 2012/168079. There are, however, no details and no objectives in relation to soiling resistance and/or (self-)cleaning properties of the coatings resulting from the coating compositions, especially after weathering exposure.

Known from WO 07/033786 are coating compositions which in addition to phosphonic diesters and diphosphonic diesters as catalyst (A) comprise silane group-containing mixtures (B), such as, for example, the mixture of the isocyanate group-free reaction product (B1) of hexamethylene diisocyanate isocyanurate with N,N-bis(3-trimethoxysilylpropan-1-yl)amine, and the isocyanate group-free reaction product (B2) of isophorone diisocyanate isocyanurate with N-(3-trimethoxysilylpropan-1-yl)-N-n-butylamine, and also optionally, as further adjuvants (C) polyacrylic resins or other binders and crosslinking agents. The coatings produced from these coating compositions, after they have been cured, again have good scratch resistance in conjunction with high resistance toward chemicals and environmental influences, but the weathering resistance is in need of improvement and the resulting coatings are decidedly brittle. Information and objectives in relation to soiling resistance and (self-)cleaning properties for the resulting coatings are not stated.

Described in WO 2001/98393 are 2-component coating compositions comprising a polyol as binder component and also as crosslinking component a mixture of a polyisocyanate (A) and a silane oligomer (B) where it comprises at least two isocyanate groups and additionally alkoxysilane groups, preferably bisalkoxysilane groups, and that is prepared by reacting a polyisocyanate (PI) with alkoxysilylamines, preferably with bisalkoxysilylamines, more particularly bis(3-propyltrimethoxysilyl)amine. As polyisocyanate (A) and also as polyisocyanate (PI) for preparing component (B), preference is given to using hexa-methylene diisocyanate and isophorone diisocyanate and also their biurets and isocyanurates. These coating compositions are used in particular as primers and are optimized for adhesion to metallic substrates, preferably to aluminum substrates. Here again there is a lack of any reference to soiling resistance and (self-)cleaning properties in the resultant coatings.

Furthermore, water-repellent coating compositions based on (meth)acrylates are known for example from EP 0348946 A1, from WO 99/26994, and from US 2012/0302693. In these coating compositions, fluorine-containing additives or fluorine-containing functional groups are introduced into a polymer framework, leading to water repellency properties and improved dirt pickup and/or cleaning properties. There is, however, no disclosure of coatings combining improved (self-)cleaning properties with a good appearance, especially not after weathering exposure. Siloxanes are used, if at all, only in the form of a dimethylpolysiloxane as flow control additive.

Known from EP 1295914 are clearcoats whose coating possesses improved water and oil repellency properties while retaining acid resistance. Described for this purpose are clearcoat materials which comprise hydroxyl and epoxy group-containing acrylates, polyester resins having a high acid number of 120-200 mg KOH/g, an acrylate containing alkoxysilyl groups, and an acrylate resin containing alkoxysilyl groups and dimethylpolysiloxane side chains, with the resulting coating possessing a Tg of between 100 and 120° C. Not disclosed, however, are weathering-stable coatings which possess reduced soiling and improved (self-)cleaning properties.

Described in U.S. Pat. No. 9,120,916 B1 are coating compositions which lead to improved soiling resistance on substrates, by application of a two-component coating composition comprising acrylates having hydroxyl and polydialkylsiloxane groups, and also chemically bonded Si particles functionalized with ethylenically unsaturated compounds. Additionally present in U.S. Pat. No. 9,187,670 B1 are functional polydialkylsiloxane groups in the curing component. Not disclosed, however, are coatings which possess improved soiling resistance and improved (self-) cleaning properties even after outdoor weathering.

Known from WO 2011/056555 A1 are scratch-resistant coating compositions formed from components with alkoxysilane groups (A), polysiloxanes containing functional groups (B), and components (C) which are reactive with the functional groups of (B). Not disclosed, however, are any soiling resistance and/or (self-)cleaning properties on the part of the resulting coatings.

The use of (fluorine-free) highly branched polyalkoxysiloxanes as additives in coating compositions for the design of improved (self-)cleaning properties and reduced soiling tendency of surface coatings is known from WO 2014/187972 A1. Not disclosed therein, however, are any weathering-resistant coatings.

Problem

The problem addressed by the present invention is therefore that of providing coating compositions, especially for automotive OEM finishing and automotive refinishing, which lead to coatings that have improved soiling resistance and (self-)cleaning properties, in particular after weathering exposure as well.

Furthermore, the coating compositions ought to meet the requirements customarily imposed on the clearcoat in automotive OEM finishes and automotive refinishes.

Solution to the Problem

In the light of the problem stated above, nonaqueous coating compositions have been found, comprising:
(A) at least one hydroxyl group-containing compound (A) having a hydroxyl number of 100 to 400 mg KOH/g and a Tg>−35° C., which is present at not less than 25 wt %, based on the binder fraction of the coating composition,
(B) at least one isocyanate group-containing compound (B) having free or blocked isocyanate groups, component (B) comprising at least one structural unit of the formula (I)

$$—NR—(X—SiR''_x(OR')_{3-x})  \quad (I),$$

and/or at least one structural unit of the formula (II)

$$—N(X—SiR''_x(OR')_{3-x})_n(X'—SiR''_y(OR')_{3-y})_m \quad (II),$$

where
R=hydrogen, alkyl, cycloalkyl, aryl, or aralkyl, it being possible for the carbon chain to be interrupted by nonadjacent oxygen, sulfur, or NRa groups, with Ra=alkyl, cycloalkyl, aryl, or aralkyl,
R'=hydrogen, alkyl, or cycloalkyl, it being possible for the carbon chain to be interrupted by nonadjacent oxygen, sulfur, or NRa groups,
X, X'=linear and/or branched alkylene or cycloalkylene radical having 1 to 20 carbon atoms,
R''=alkyl, cycloalkyl, aryl, or aralkyl, it being possible for the carbon chain to be interrupted by nonadjacent oxygen, sulfur, or NRa groups,
n=0 to 2, m=0 to 2, m+n=2, and x, y=0 to 2,
and
(C) at least one catalyst (C) for the crosslinking of silane groups,
wherein additionally there is
(D) at least one alkoxysilyl-functional siloxane of the formula (III)

$$R^1—SiR^2_2-A_x-B_y—O—SiR^3_2—R^4 \quad (III)$$

in which
A is a group —[O—SiR$^5_2$]— and B is a group —[O—SiR$^6$R$^7$]—,
R$^2$, R$^3$, R$^5$, and R$^6$ independently of one another are linear or branched alkyl groups having 1 to 4 carbon atoms,
R$^1$, R$^4$, and R$^7$ independently of one another are a group -L-R$^8$,
in which L=a linear or branched divalent alkyl group and R$^8$=H or —Si(R$^9$)$_z$(OR$^{10}$)$_{3-z}$ with R$^9$, R$^{10}$=a linear or branched alkyl group having 1-4 carbon atoms and z=0, 1, or 2, preferably z=0,
with the proviso that at least one of the radicals R$^1$ or R$^4$ and/or at least one group B constitutes a group R$^8$=—Si(R$^9$)$_z$(OR$^{10}$)$_{3-z}$,
x independently is an integer of 1-20,
y independently is an integer of 0-10,
and preferably x+y≤20.

The new nonaqueous coating composition is also referred to below as nonaqueous coating composition of the invention. Preferred embodiments of the nonaqueous coating composition of the invention are apparent from the description hereinafter and from the dependent claims.

The present invention also provides a method for producing coatings and multicoat coatings using the coating composition of the invention, and also a coating or multicoat coating produced by means of said method. The present invention further relates to the use of the coating composition of the invention for improving the soiling resistance and (self-)cleaning properties of coatings, especially of clearcoat coatings.

The coating produced by means of the coating composition of the invention has in particular an excellent soiling resistance and good (self-)cleaning properties while at the same time retaining a good appearance, in particular good haze resistance and cratering resistance, even after weathering exposure.

DESCRIPTION OF THE INVENTION

The Coating Composition of the Invention

The coating composition of the invention is nonaqueous. This means, as is known, that for the purposes of the present invention, the coating compositions comprise organic solvents or are formulated as water-free systems. In any case the coating composition comprises water only in minor quantities, and preferably no water (water-free). With more particular preference there is less than 5 wt % of water, preferably less than 2.5 wt % of water, based on the total weight of the coating composition. Water is therefore used preferably only, if at all, through the use of, for example, typical coatings additives in the coating composition.

The Hydroxyl Group-Containing Compound (A)

The nonaqueous coating composition comprises at least one hydroxyl group-containing compound (A) having a hydroxyl number of 100 to 400 mg KOH/g and a Tg>−35° C., which is present at not less than 25 wt %, based on the binder fraction of the coating composition.

As hydroxyl group-containing compound (A) it is possible to use any compounds known in this sense to the skilled person. Preferred compounds (A) are those which have on average at least 2 hydroxyl groups per molecule and are oligomeric and/or polymeric. As compounds (A) it is also possible to use mixtures of different oligomeric and/or polymeric, hydroxyl group-containing compounds.

The preferred oligomeric and/or polymeric, hydroxyl group-containing compounds (A) have mass-average molecular weights Mw>500 daltons, measured by gel permeation chromatography (GPC) against a polystyrene standard, preferably of between 800 and 100 000 daltons, more particularly of between 1000 and 50 000 daltons.

Particularly preferred are polyester polyols, polyurethane polyols, polysiloxane polyols, polyacrylate polyols and/or polymethacrylate polyols, and also their copolymers, called poly(meth)acrylate polyols hereinafter.

The hydroxyl group-containing compounds (A) have a hydroxyl number (OH number) of 100 to 400 mg KOH/g, preferably of 150 to 250 KOH/g. The OH number indicates the number of mg of potassium hydroxide which are equivalent to the amount of acetic acid bound by 1 g of solid substance in acetylation. For the determination, the sample is boiled with acetic anhydride-pyridine and the resulting acid is titrated with potassium hydroxide solution (DIN 53240-2).

The glass transition temperature Tg of the hydroxyl group-containing compounds (A) is above −35° C., preferably from −35 to 100° C., more preferably from −30° C. to 80° C. (measured by DSC measurements in accordance with DIN EN ISO 11357-2; see also Examples section).

Moreover, the hydroxyl group-containing compounds (A) preferably have an acid number of 0 to 30 mg KOH/g. The acid number here indicates the number of mg of potassium hydroxide consumed in the neutralization of 1 g of the respective compound (DIN EN ISO 2114).

Suitable polyester polyols are described for example in EP 0 994 117 A1 and EP 1 273 640 A1. Polyurethane polyols are prepared preferably by reaction of polyester polyol prepolymers with suitable di- or polyisocyanates and are described for example in EP 273 640 A1. Suitable polysiloxane polyols are described for example in WO 01/09260, the polysiloxane polyols recited therein being employable preferably in combination with other polyols, especially those having relatively high glass transition temperatures.

Very preferably component (A) comprises one or more poly(meth)acrylate polyols. Together with the poly(meth) acrylate polyol or polyols there may be further oligomeric and/or polymeric, polyhydroxyl group-containing compounds used, examples being polyester polyols, polyurethane polyols, and polysiloxane polyols, especially polyester polyols.

The poly(meth)acrylate polyols that are especially preferred in accordance with the invention are generally copolymers and preferably mass-average-molecular weights $M_w$ between 1000 and 20 000 daltons, more particularly of between 1500 and 10 000 daltons, measured in each case by gel permeation chromatography (GPC) against a polystyrene standard.

The glass transition temperature Tg of the especially preferred poly(meth)acrylate polyols is preferably from −35 to 100° C., more particularly from −35 to 20° C. (measured by DSC measurements in accordance with DIN EN ISO 11357-2, see also Examples section).

The especially preferred poly(meth)acrylate polyols have an OH number of 100 to 300 mg KOH/g, more particularly of 150 to 200 mg KOH/g, and an acid number of 0 to 30 mg KOH/g.

The hydroxyl number (OH number) and acid number are determined as described above (DIN 53240-2 and DIN EN ISO 2114).

Hydroxyl group-containing monomer units used are preferably hydroxyalkyl (meth)acrylates, such as especially 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also especially 4-hydroxybutyl acrylate and/or 4-hydroxybutyl methacrylate.

Further monomer units used for the poly(meth)acrylate polyols are preferably alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or especially cyclohexyl acrylate and/or cyclohexyl methacrylate.

Further monomer units which can be used for the poly (meth)acrylate polyols are vinylaromatic hydrocarbons, such as vinyltoluene, alpha-methylstyrene, or especially styrene, amides or nitriles of acrylic or methacrylic acid, vinyl esters or vinyl ethers, and also, in minor amounts, in particular, acrylic and/or methacrylic acid.

To an extent of at least 25 wt %, preferably from 25 to 70 wt %, based in each case on the binder fraction of the coating composition, coating compositions of the invention comprise at least one hydroxyl group-containing compound (A) having a hydroxyl number of 100 to 400 mg KOH/g and a Tg>−35° C., more particularly at least one hydroxyl group-containing compound (A) having a hydroxyl number of 100 to 250 mg KOH/g and a Tg of −35° C. to 100° C.

Especially preferred coating compositions of the invention are those which to an extent of at least 25 wt %, preferably of 25 to 70 wt %, based in each case on the binder fraction of the coating composition, comprise at least one poly(meth)acrylate polyol (A) having a hydroxyl number of 100 to 300 mg KOH/g and a Tg of −35° C. to 100° C., more particularly at least one poly (meth)acrylate polyol (A) having a hydroxyl number of 150 to 200 mg KOH/g and a Tg of −35° C. to 20° C.

The binder fraction referred to here means in each case that fraction of the coating composition prior to crosslinking that is soluble in tetrahydrofuran (THF). For this purpose, a small sample (P) is weighed out and dissolved in 50 to 100 times the amount of THF, insoluble constituents are removed by filtration, the THF is evaporated off, and then the mass of the constituents previously dissolved in THF is determined by drying at 130° C. for 60 minutes, cooling in a desiccator, and then reweighing. The residue corresponds to the binder fraction of the sample (P) and is recorded in wt %.

As is known, binders is the term used for organic compounds and coating compositions that are responsible for film formation. They represent the nonvolatile fraction of the coating composition minus pigments and fillers, in accordance with the relevant DIN EN ISO 4618. From the coating composition, then, after application to a (heterogeneous) substrate, a polymer film is formed, and so the coating film or coating formed is based on an organic polymer matrix.

The Isocyanate Group-Containing Compound (B)

The nonaqueous coating composition comprises at least one specific isocyanate group-containing compound (B) having free or blocked isocyanate groups.

The di- and/or polyisocyanates which serve as parent structures for the isocyanate group-containing compounds (B) employed with preference in accordance with the invention are preferably conventional substituted or unsubstituted aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Covestro), tetramethylxylyl diisocyanates (e.g., TMXDI® from American Cyanamid), and mixtures of the aforesaid polyisocyanates. Additionally preferred polyisocyanates are the isocyanurate trimers and/or allophanate dimers and/or biuret dimers and/or uretdione dimers of the aforementioned diisocyanates.

In a further embodiment of the invention, the polyisocyanates are polyisocyanate prepolymers having urethane structural units, which are obtained by reacting polyols with a stoichiometric excess of aforementioned polyisocyanates. Polyisocyanate prepolymers of this kind are described for example in U.S. Pat. No. 4,598,131.

Particularly preferred polyisocyanate parent structures for component (B) are hexamethylene diisocyanate, isophorone diisocyanate, and 4,4'-methylenedicyclohexyl diisocyanate and/or their isocyanurate trimers and/or their allophanate dimers and/or their biuret dimers and/or their uretdione dimers.

The polyisocyanates and/or their isocyanurate trimers and/or their allophanate dimers and/or their biuret dimers and/or their uretdione dimers that are used as component (B) additionally further comprise at least one structural unit of the formula (I)

$$—NR—(X—SiR''_x(OR')_{3-x}) \qquad (I),$$

and/or at least one structural unit of the formula (II)

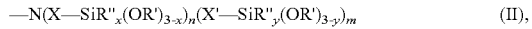
$$—N(X—SiR''_x(OR')_{3-x})_n(X'—SiR''_y(OR')_{3-y})_m \qquad (II),$$

where
R=hydrogen, alkyl, cycloalkyl, aryl, or aralkyl, it being possible for the carbon chain to be interrupted by nonadjacent oxygen, sulfur, or NRa groups, with Ra=alkyl, cycloalkyl, aryl, or aralkyl,
R'=hydrogen, alkyl, or cycloalkyl, it being possible for the carbon chain to be interrupted by nonadjacent oxygen, sulfur, or NRa groups, where Ra=alkyl, cycloalkyl, aryl, or aralkyl, preferably R'=methyl and/or ethyl,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl, or aralkyl, it being possible for the carbon chain to be interrupted by nonadjacent oxygen, sulfur, or NRa groups, with Ra=alkyl, cycloalkyl, aryl, or aralkyl, preferably R''=alkyl radical, more particularly having 1 to 6 C atoms,
n=0 to 2, m=0 to 2, m+n=2, and x, y=0 to 2.

The respective preferred alkoxy radicals (OR') may be the same or different; what is critical for the construction of the radicals, however, is the extent to which they influence the reactivity of the hydrolyzable silane groups. Preferably R' is an alkyl radical, more particularly having 1 to 6 C atoms. Particularly preferred are radicals R' which raise the reactivity of the silane groups, i.e., represent good leaving groups. Accordingly, a methoxy radical is preferred over an ethoxy radical, which is preferred in turn over a propoxy radical. With particular preference, therefore, R'=ethyl and/or methyl, particularly methyl.

The reactivity of organofunctional silanes may additionally be influenced by the length of the spacers X, X' between silane functionality and organic functional groups serving for reaction with the constituent to be modified, the influence being considerable. Stated by way of example in this respect are the "alpha"-silanes, which are available from Wacker, and in which a methylene group, instead of the propylene group present in the case of "gamma"-silanes, is between Si atom and functional group.

The components (B) used with preference in accordance with the invention, functionalized with the structural units (I) and/or (II), are obtained in particular by reaction of polyisocyanates and/or their isocyanurate trimers and/or their allophanate dimers and/or their biuret dimers and/or uretdione dimers with at least one compound of the formula (Ia)

$$H—NR—(X—SiR''_x(OR')_{3-x}) \qquad (Ia)$$

and/or with at least one compound of the formula (IIa)

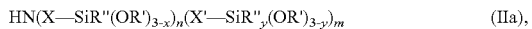
$$HN(X—SiR''(OR')_{3-x})_n(X'—SiR''_y(OR')_{3-y})_m \qquad (IIa),$$

where the substituents have the definition stated above.

The components (B) used with particular preference in accordance with the invention, functionalized with the structural units (I) and (II), are obtained more preferably by reaction of polyisocyanates and/or their isocyanurate trimers and/or their allophanate dimers and/or their biuret dimers and/or uretdione dimers with at least one compound of the formula (Ia) and with at least one compound of the formula (IIa), where the substituents have the definition stated above.

Compounds (IIa) preferred in accordance with the invention are bis(2-ethyltrimethoxysilyl)amine, bis(3-propyltrimethoxysilyl)amine, bis(4-butyltrimethoxy-silyl)amine, bis(2-ethyltriethoxysilyl)amine, bis(3-propyltriethoxysilyl)amine and/or bis(4-butyl-triethoxysilyl)amine. Especially preferred is bis(3-propyltrimethoxysilyl)amine. Aminosilanes of this kind are available for example under the brand name DYNASYLAN® from Evonik or Silquest® from Momentive.

Compounds (Ia) preferred in accordance with the invention are N-(2-(trimethoxysilyl)ethyl)alkylamines, N-(3-(trimethoxysilyl)propyl)alkylamines, N-(4-(tri-methoxysilyl)butyl)alkylamines, N-(2-(triethoxysilyl)-ethyl)alkylamines, N-(3-(triethoxysilyl)propyl)-alkylamines and/or N-(4-(triethoxysilyl)butyl)-alkylamines. Especially preferred is N-(3-(trimethoxysilyl)propyl)butylamine. Aminosilanes of this kind are available for example under the brand name DYNASYLAN® from Evonik or Silquest® from Momentive.

Preferably in the component (B) between 10 and 90 mol %, preferably between 20 and 80 mol %, more preferably more than 30 and less than 70 mol %, and very preferably between 31 and 50 mol % of the isocyanate groups originally present have undergone reaction to give structural units (I) and/or (II).

The amount of structural units (I) in the compound (B) is preferably between 5 and 70 mol %, more preferably between 8 and 50 mol %, very preferably between 9 and 40 mol %, based in each case on the entirety of the structural units (I) plus (II), and the total amount of structural units (II) in the component (B) is preferably between 95 and 30 mol %, more preferably between 92 and 50 mol %, and very preferably between 91 and 60 mol %, based in each case on the entirety of the structural units (I) plus (II).

It is particularly preferred, furthermore, for more than 25 mol % and less than 36 mol %, preferably between 26 and 35 mol %, of the isocyanate groups originally present in the isocyanate group-containing compound (B) to have undergone reaction to give bissilane structural units (II).

Especially preferred coating compositions are obtained if, in the compound (B), the total amount of structural units (I) is between 9 and 40 mol % and the total amount of structural units (II) is between 91 and 60 mol %, based in each case on the entirety of the structural units (I) plus (II),
and
between 31 and 50 mol % of the isocyanate groups originally present in (B) have undergone reaction to give structural units (I) and (II), and in the compound (B) between 26 and 35 mol % of the isocyanate groups originally present have undergone reaction to give structural units (II).

The reaction of the isocyanate group-containing compounds (B) with the compounds (Ia) and/or (IIa) takes place preferably in an inert gas atmosphere at temperatures of not more than 100° C., preferably of not more than 60° C.

The free isocyanate groups of the isocyanate group-containing compounds B may also be used in blocked form. This is preferably the case when the coating compositions of the invention are used as one-component systems. For the blocking it is possible in principle to use any blocking agent which can be used for the blocking of polyisocyanates and which has a sufficiently low deblocking temperature. Blocking agents of this kind are very familiar to the skilled person. Preference is given to using blocking agents of the kind described in EP 0 626 888 A1 and EP 0 692 007 A1.

Preferred coating compositions of the invention are those containing from 15 to 60 wt %, preferably from 20 to 50 wt %, based in each case on the binder fraction (for definition see above) of the coating composition, of the isocyanate group-containing compound (B).

Catalyst (C)

The coating composition of the invention comprises at least one catalyst (C) for the crosslinking of the silane groups. Examples are metal complexes with chelate ligands based on zinc or aluminum, such as the Lewis acids or titanates described in WO 05/03340, for example—when selecting the catalysts, however, it must be ensured that they do not lead to yellowing of the coating compositions. Moreover, a number of catalysts whose use is customary (e.g., organotin compounds) are less desirable, for reasons of toxicology.

It is therefore preferred to use phosphorus catalysts, more particularly phosphorus and nitrogen catalysts, as catalyst (C). It is also possible in this case to use mixtures of two or more different catalysts (C).

Examples of suitable phosphorus catalysts (C) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described for example in the German patent application DE 102005045228 A1.

Use is made more particularly, however, of substituted phosphoric monoesters and phosphoric diesters, preferably from the group consisting of acyclic phosphoric diesters and cyclic phosphoric diesters, more preferably amine adducts of the phosphoric monoesters and diesters.

As catalyst (C) it is especially preferred to use the corresponding amine-blocked phosphoric esters, and here more particularly amine-blocked ethylhexyl phosphates and amine-blocked phenyl phosphates, very preferably amine-blocked bis(2-ethylhexyl) phosphates.

Examples of amines with which the phosphoric esters are blocked are more particularly tertiary amines, examples being bicyclic amines, such as diazabicyclooctane (DABCO), diazabicyclononene (DBN), diazabicycloundecene (DBU), dimethyldodecylamine or triethylamine, for example. For the blocking of the phosphoric esters it is particularly preferred to use tertiary amines, which ensure high activity of the catalyst under the curing conditions of 140° C.

Certain amine-blocked phosphoric acid catalysts are also available commercially (e.g., Nacure products from King Industries). By way of example, under the designation Nacure 4167, King Industries offer a particularly suitable catalyst which is based on an amine-blocked phosphoric acid partial ester.

The catalysts are used preferably in fractions of 0.01 to 10 wt %, more preferably in fractions of 0.1 to 5 wt %, by weight, based on the binder fraction (for definitions, see above) of the coating composition of the invention. A lower activity on the part of the catalyst can be partly compensated by correspondingly higher quantities employed.

The coating compositions of the invention may further comprise an additional amine catalyst based on a bicyclic amine, more particularly an unsaturated bicyclic amine. Examples of suitable amine catalysts are 1,5-diazabicyclo[4.3.0]non-5-ene or 1,8-diazabicyclo[5.4.0]undec-7-ene.

These amine catalysts when used are employed preferably in fractions of 0.01 to 10 wt %, more preferably in fractions of 0.1 to 5 wt %, based on the binder fraction of the coating composition of the invention.

Alkoxysilyl-Functional Siloxane (D)

A nonaqueous coating composition further comprises at least one alkoxysilyl-functional siloxane (D).

The skilled person is familiar with siloxanes. They are components derived from pure silanes (that is, from binary compounds consisting of Si and H) (derivatives of pure silanes) of the general formula $R_3Si$—$[O$—$SiR_2]_n$—$O$—$SiR_3$, where R may be hydrogen atoms or alkyl groups. In siloxanes, then, the silicon atoms are linked to their adjacent silicon atom via exactly one oxygen atom, and they contain at least one Si—O—Si bond. Where at least one of the hydrogen atoms is replaced by an organic radical such as an alkyl group, for example, they are also referred to as organosiloxanes. Oligomeric or polymeric organosiloxanes (siloxanes where R≠H) possess long Si—O main chains and are referred to in turn as silicones.

Where the above-described organic radical in the organosiloxane also contains at least one alkoxysilyl group, and hence at least one hydrogen residue in the organic radical is substituted by an alkoxysilyl group, and so, at least proportionally, a hydrogen in the derivative of the pure siloxane is substituted by an organic radical which itself in turn contains an alkoxysilyl-functional group, the corresponding compound is identified for the purposes of the present invention as an alkoxysilyl-functional siloxane.

An alkoxysilyl-functional radical is a functional group which derives from an alkoxysilane, a component derived from a pure silane and containing a group Si—OR. Therefore at least one hydrogen atom of a pure silane is substituted by an alkoxy group —OR, in other words an alkyl group joined via oxygen to the silicon. Examples include mono-, di-, or trimethoxy- or -ethoxysilane.

Accordingly, the alkoxysilyl-functional siloxanes for use in accordance with the invention are derivatives of the siloxane in which at least one hydrogen atom has been substituted by an organic radical, in which, in turn, at least one hydrogen residue has been replaced by an alkoxysilyl group. The alkoxysilyl group can therefore always be understood as a functional group of an alkyl group which is itself attached to the siloxane framework. The alkoxysilyl group, then, is always connected to the Si—O—Si framework by a divalent organic radical R, an alkylene for example, and never attaches directly to the siloxane parent structure made of Si—O—Si units.

The at least one alkoxysilyl-functional siloxane (D) may be linear, branched, or cyclic. Preferably it is linear.

Preferred alkoxysilyl-functional siloxanes (D) are described by way of the following general formula (III):

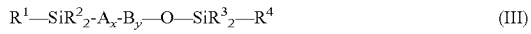
$$R^1\text{—}SiR^2{}_2\text{-}A_x\text{-}B_y\text{—}O\text{—}SiR^3{}_2\text{—}R^4 \qquad (III)$$

in which
A is a group —[O—$SiR^5{}_2$]— and B is a group —[O—$SiR^6R^7$]—,
$R^2$, $R^3$, $R^5$, and $R^6$ independently of one another are linear or branched alkyl groups having 1 to 4 carbon atoms,
$R^1$, $R^4$, and $R^7$ independently of one another are a group -L-$R^8$,
in which L=a linear or branched divalent alkyl group and $R^8$=H or —$Si(R^9)_z(OR^{10})_{3-z}$ with $R^9$, $R^{10}$=a linear or branched alkyl group having 1-4 carbon atoms and z=0, 1, or 2, preferably z=0,
with the proviso that at least one of the radicals $R^1$ or $R^4$ and/or at least one group B constitutes a group $R^8$=—$Si(R^9)_z(OR^{10})_{3-z}$,
x independently is an integer of 1-20,
y independently is an integer of 0-10,
and preferably x+y 20.
The siloxane (D) therefore in any case contains at least one group —$Si(R^9)_z(OR^{10})_{3-z}$.
Where y>0, there are not only building blocks A but also building blocks B present in the polysiloxane chain. If, on the other hand, y=0, there are only building blocks A present. Preferably there are only building blocks A present (y=0). More preferably y=0 and x is a number from 6 to 14.

The alkoxysilyl-functional siloxanes (D) may have a linear or branched form, according to which radicals $R^1$, $R^4$ and/or $R^7$ contain an alkoxysilyl group. Where alkoxysilyl groups in the form of the radical $R^8$=—$Si(R^9)_z(OR^{10})_{3-z}$ with $R^9$, $R^{10}$=a linear or branched alkyl group having 1-4 carbon atoms and z=0, 1, or 2, preferably z=0, are arranged only terminally in the radicals $R^1$ and $R^4$, the alkoxysilyl-functional siloxane is linear. If, on the other hand, there are also alkoxysilyl groups in the radical $R^7$, the siloxane is branched. Preferably the siloxane is linear.

The radicals $R^1$, $R^4$, and $R^7$ are identical or different radicals, with at least one of the radicals always representing the group -L-$R^8$, in which $R^8$ corresponds to an alkoxysilyl group. Very preferably at least one of these radicals $R^1$, $R^4$, and $R^7$ has a group -L-$R^B$ in which L is an ethylene group and $R^8$ is a trialkoxysilane group. Very preferably L is an ethylene group and $R^8$ is a trimethoxysilane or triethoxysilane group. Again very preferably y=0 and both terminal groups $R^1$ and $R^4$ represent a group -L-$R^B$ in which L is an ethylene group and $R^8$ is a trimethoxysilane or triethoxysilane group. In a further very preferred embodiment, y>0, $R^7$ corresponds to a group -L-$R^8$ in which L is an ethylene group and $R^8$ is a trialkoxysilane group, and $R^1$ and $R^4$ are a group -L-$R^B$ in which $R^8$ corresponds to a hydrogen atom.

With particular preference the radicals $R^2$, $R^3$, $R^5$, $R^6$, $R^9$, and $R^{10}$ are identical or different alkyl radicals, and very preferably these radicals $R^2$, $R^3$, $R^5$, $R^6$, $R^9$, and $R^{10}$ are linear alkyl groups having one to four carbon atoms, and again very preferably the radicals $R^2$, $R^3$, $R^5$, $R^6$, $R^9$, and $R^{10}$ are methyl and/or ethyl radicals, more particularly methyl radicals.

In the coating composition of the invention there is at least one alkoxysilyl-functional siloxane (D). Accordingly, alkoxysilyl-functional siloxanes having the alkoxysilyl function in the side chain may be present alongside those in which the alkoxysilyl function or functions is or are present terminally on the siloxane chain.

Preference is given to admixing the coating composition of the invention with those alkoxysilyl-functional siloxanes (D) that bring about a lowering of the surface energy of the coating produced by applying and curing the coating composition of the invention.

Such particularly preferred, alkoxysilyl-functional siloxanes (D) are available commercially from the company Shin Etsu.

The coating compositions of the invention preferably comprise from 0.05 to 15.0 wt %, preferably from 0.1 to 8.0 wt %, and more preferably from 0.2 to 5.0 wt % of at least one alkoxysilyl-functional siloxane (D), the wt % figures being based in each case on the binder fraction (for definition, see above) of the coating composition.

The Combination of Components (A), (B), (C), and (D) and Also Further Components of the Coating Composition Where the compositions are one-component (1K) coating compositions, the isocyanate group-containing compounds (B) selected have their free isocyanate groups blocked by blocking agents. The isocyanate groups may be blocked for example with substituted pyrazoles, more particularly with alkyl-substituted pyrazoles, such as 3-methylpyrazole, 3,5-dimethylpyrazole, 4-nitro-3,5-dimethypyrazole, 4-bromo-3,5-dimethylpyrazole, and the like. With particular preference the isocyanate groups in component (B) are blocked with 3,5-dimethylpyrazole.

In the case of the two-component (2K) coating compositions, to which the invention gives particular preference, shortly before the application of the coating composition a coating component comprising the hydroxyl group-containing compound (A) and also further components, described below, is mixed with a further coating component, comprising the isocyanate group-containing compound (B) and also, optionally, further of the components described below, mixing taking place in a conventional way; in general, the coating component which comprises the compound (A) also comprises the catalyst (C), the alkoxysilyl-functional siloxane (D), and a part of the solvent. With preference the alkoxysilyl-functional siloxane (D) is present only in the coating component which comprises the compound (A).

Hydroxyl group-containing compounds (A) employed with preference are those which in combination with the other constituents, especially with the isocyanate-containing compounds (B), lead to coatings which possess a glass transition temperature (Tg) of preferably more than 70° C., especially preferably more than 75° C., and a crosslinking density of preferably more than $3.0 \times 10^7$ Pa, more particularly more than $4.0 \times 10^7$ Pa (for measurement methods, see Examples).

The weight fractions of the hydroxyl group-containing compound (A) and of the isocyanate group-containing compound (B) are preferably selected such that the molar equivalents ratio of the hydroxyl groups of the compound (A) to the isocyanate groups of the compound (B) is between 1:0.5 and 1:1.5, preferably between 1:0.8 and 1:1.2, more preferably between 1:0.9 and 1:1.1.

The hydroxyl group-containing compound (A) and the isocyanate group-containing compound (B) may be present in a suitable organic solvent.

Organic solvents (L) suitable for the coating compositions of the invention are in particular those which in the coating composition are chemically inert toward the compounds (A) and (B) and which also do not react with (A) and/or (B) when the coating composition is being cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned organic solvents. The aprotic solvents or solvent mixtures preferably have a water content of not more than 1 wt %, more preferably not more than 0.5 wt %, based on the organic solvent.

The coating compositions of the invention are nonaqueous coating compositions and may comprise organic solvents or may be formulated as solvent-free systems. Examples of suitable solvents are the organic solvents (L) already listed above. The organic solvent or solvents is or are used preferably in the coating compositions of the invention in an amount such that the solids content of the coating composition is at least 45 wt %, more preferably at least 55 wt %.

Besides the compounds (A) and (B), it is possible additionally to use further binders (E), which preferably are able to react and form network points with the hydroxyl groups of the hydroxyl group-containing compound (A) and/or with the free isocyanate groups of the compound (B) and/or with the alkoxysilyl groups of the compound (B) and/or of the compound (D). Further binders (E) are preferably present in organic solvents.

As component (E) it is possible for example to use amino resins and/or epoxy resins. The customary and known amino resins are contemplated, some of whose methylol and/or methoxymethyl groups may have been functionalized by means of carbamate or allophanate groups. Crosslinking agents of this kind are described in patents EP 0245700 B1 and US 2005/0182189 A1, page 1, paragraph [0014], to page 4, paragraph [0028], and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

Examples of suitable amino resins (E) are all amino resins commonly used within the coating industry sector, the properties of the resultant coating compositions being controllable via the reactivity of the amino resin. These resins are condensation products of aldehydes, especially formaldehyde, and for example urea, melamine, guanamine, and benzoguanamine. The amino resins contain alcohol groups, preferably methylol groups, of which in general some or, preferably, all have undergone etherification with alcohols. Use is made more particularly of amino resins etherified with lower alcohols. Preference is given to using amino resins etherified with methanol and/or ethanol and/or butanol, examples being products available commercially under the names Cymel®, Resimene®, Maprenal®, and Luwipal®.

The coating compositions of the invention preferably comprise from 0 to 15 wt %, based on the binder fraction of the coating composition of the invention, of one or more amino resins and/or of one or more tris(alkoxycarbonylamino)triazines (E).

Furthermore, the coating composition of the invention may comprise at least one customary and known coatings additive (F), different from the components above, in effective amounts, these being amounts of preferably up to 30 wt %, more preferably up 25 wt %, and more particularly up to 20 wt %, based in each case on the binder fraction of the coating composition.

Examples of suitable coatings additives (F) are as follows:
especially, UV absorbers;
especially, light stabilizers such as HALS compounds, benzotriazoles, or oxalanilides;
radical scavengers;
slip additives;
polymerization inhibitors;
defoamers;
reactive diluents, more particularly reactive diluents which become reactive only on reaction with further constituents and/or water, such as Incozol® or aspartic esters, for example;
wetting agents such as fluorine compounds, carboxylic monoesters, phosphoric esters, polyacrylic acids and copolymers thereof, or polyurethanes;
adhesion promoters;
flow control agents;
film-forming auxiliaries such as cellulose derivatives;
fillers such as, for example, nanoparticles based on silicon dioxide, aluminum oxide, or zirconium oxide; for further details, refer to Römpp Lexikon "Lacke und Druckfarben", Georg Thieme Verlag, Stuttgart, 1998, pages 250 to 252;
rheological control additives, such as the additives known from patents WO 94/22968, EP 0276501 A1, EP 0249201 A1 or WO 97/12945; crosslinked polymeric microparticles, as disclosed for example in EP 0008127 A1; inorganic phyllosilicates such as aluminum magnesium silicates, sodium, magnesium and sodium magnesium fluorine lithium phyllosilicates of the montmorillonite type; silicas such as Aerosils®; or synthetic polymers having ionic and/or associative groups such as poly(meth)acrylamide, poly(meth)acrylic acid, polyvinylpyrrolidone, styrene-maleic anhydride copolymers or ethylene-maleic anhydride copolymers and derivatives thereof, or hydrophobically modified ethoxylated urethanes or polyacrylates;
flame retardants.

With particular preference the coating compositions used in accordance with the invention comprise, further to the alkoxysilyl-functional siloxane (D), as additive (F), less than 1 wt %, more particularly less than 0.2 wt %, more preferably less than 0.05 wt % of an additional (to compound (D)) hydrophobizing agent, based in each case on the binder fraction of the coating composition, and very preferably contain no additional hydrophobizing agent at all, more particularly no additional hydrophobizing agent based on fluorine. Hydrophobizing agents here, as is known, are additives which significantly lower the surface energy of the resulting coating, i.e., significantly increase the contact angle with water of the resulting cured coating.

Particularly preferred are coating compositions which comprise from 25 to 70 wt %, based on the binder fraction of the coating material of the invention, of at least one poly(meth)acrylate polyol (A) having a hydroxyl number of 100 to 300 mg KOH/g and a Tg of −35° C. to 100° C.,
20 to 50 wt %, based on the binder fraction of the coating composition of the invention, of the isocyanate group-containing compound (B),
0.1 to 5 wt %, based on the binder fraction of the coating composition of the invention, of at least one catalyst (C),
0.2 to 5.0 wt %, based on the binder fraction of the coating composition of the invention, of at least one alkoxysilyl-functional siloxane (D),
0 to 15 wt %, based on the binder composition of the coating composition of the invention, of one or more amino resins and/or one or more tris(alkoxycarbonylamino)triazines (E), and
0 to 20 wt %, based on the binder fraction of the coating composition of the invention, of at least one customary and known coatings additive (F), the solids content of the coating composition being at least 45 wt %, more preferably at least 55 wt %.

Within this preferred embodiment, of course, all advantageous variants described earlier on above, in relation for example to components (A) to (D), should likewise be considered to be advantageous. This applies to the combination of the preferred embodiment with only one or else with two or more of the advantageous variants described above.

In a further embodiment of the invention, the coating composition of the invention may further comprise additional pigments and/or fillers and may serve for the production of pigmented topcoats. The pigments and/or fillers employed for these purposes are known to the skilled person. The pigments are typically used in an amount such that the pigment-to-binder ratio is between 0.05:1 and 1.5:1, based in each case on the binder fraction of the coating composition.

Method for Producing Coatings, and Coatings Produced with the Method

The present invention also provides a method for producing coatings and multicoat coatings using the coating composition of the invention and also a coating or multicoat coating produced by means of said method.

The application of the coating compositions of the invention may take place by any of the customary application methods, such as, for example, spraying, knifecoating, brushing, pouring, dipping, impregnating, trickling or rolling. With respect to such application, the substrate to be coated may itself be at rest, with the application unit or equipment being moved. Alternatively, the substrate to be coated may be moved, with the application unit being at rest relative to the substrate or being moved appropriately.

Preference is given to employing spray application methods, such as, for example, compressed air spraying, airless spraying, high speed rotation, electrostatic spray application (ESTA), alone or in conjunction with hot spray application such as hot air spraying, for example.

The curing of the applied coating compositions of the invention may take place after a certain rest time. The rest time serves, for example, for the leveling and degassing of the coating films or for the evaporation of volatile constituents such as solvents. The rest time may be assisted and/or shortened through the application of elevated temperatures and/or through a reduced atmospheric humidity, provided that this does not entail any instances of damage to or change in the coating films, such as a premature complete crosslinking.

The thermal curing of the coating compositions has no peculiarities in terms of method, but instead takes place in accordance with the customary and known methods, such as heating in a forced air oven or irradiation with IR lamps. This thermal curing may also take place in stages. Another preferred curing method is that of curing with near infrared (NIR radiation).

The thermal curing takes place advantageously at a temperature of 20 to 200° C., preferably at a temperature of 60 to 150° C. for a time of 1 min up to 10 h, with longer cure times also being employable at low temperatures. For automotive finishing and for the coating of plastics parts, and also for the coating of commercial vehicles, temperatures are typically employed here of preferably between 60 and 150° C. For automotive refinishing, it is usual here to employ lower temperatures, of preferably between 20 and 80° C., more particularly between 20 and 60° C.

Since the coatings of the invention produced from the coating compositions of the invention adhere outstandingly even to already-cured electrocoats, primer-surfacer coats, basecoats or customary and known clearcoats, they are outstandingly suitable, in addition to their use in automotive OEM (production-line) finishing, for automotive refinishing and/or for the coating of parts for installation in or on motor vehicles, and/or for the coating of commercial vehicles.

The coating compositions of the invention are outstandingly suitable for forming decorative, protective, functional and/or effect coatings and finishes, especially ones resistant to soiling, on bodywork of means of transport (especially powered vehicles, such as cycles, motorcycles, buses, trucks or automobiles) or of parts thereof; on the interior and exterior of edifices; on furniture, windows and doors; on plastics moldings, especially CDs and windows; on small industrial parts, containers and packaging; on white goods; on films; on optical, electrical and mechanical components; and also on hollow glassware and articles of everyday use.

The coating compositions of the invention can therefore be applied, for example, to an uncoated or precoated metal or plastics substrate treated with primer-surfacer, the coating compositions of the invention being either pigmented or unpigmented, but preferably unpigmented and forming a clearcoat coating after application and curing. The coating compositions and finishes of the invention in particular, more particularly as clearcoat coatings, are employed in the technologically and esthetically particularly demanding field of automotive OEM finishing and for the coating of plastics parts for installation in or on automobile bodies, more particularly for top-class automobile bodies, such as, for example, for producing roofs, hatches, hoods, fenders, bumpers, spoilers, sills, protective strips, side trim and the like, and also for automotive refinishing, and for the finishing of commercial vehicles, such as, for example, of trucks, chain-driven construction vehicles, such as crane vehicles, wheel loaders and concrete mixers, buses, rail vehicles, watercraft, aircraft, and also agricultural equipment such as tractors and combines, and parts thereof.

If a metal substrate is to be coated, it is preferably coated additionally with an electrocoat before the primer-surfacer is applied.

Where a plastics substrate is being coated, it is preferably also pretreated prior to application of the primer-surfacer. The most frequently employed pretreatment methods are flaming, plasma treatment, and corona discharge.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably with a polycarbonate fraction>40%, more particularly >50%.

ASA refers generally to impact-modified styrene/acrylonitrile polymers, in which graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference, the coating compositions of the invention are used in multistage coating processes, more particularly in processes in which an optionally precoated substrate, one optionally treated with primer-surfacer, is coated first with one or more pigmented basecoat films and then with a film with the coating composition of the invention, preferably as a clearcoat film. The invention accordingly also provides multicoat color and/or effect finishes comprising at least one pigmented basecoat and at least one clearcoat applied thereon, these finishes being characterized in that the clearcoat has been produced from the coating composition of the invention. The coating compositions of the invention are used preferably for producing clearcoats in a multistage coating method within the field of automotive OEM finishing.

In the multistage coating method described above, basecoat and clearcoat can be cured jointly in a wet-on-wet method, or separately. In a wet-on-wet method, the clearcoat is applied to a basecoat or to the topmost basecoat, which is uncured. Curing then takes place at the end, together with the clearcoat. Curing, however, may also take place separately for each basecoat or clearcoat, in other words after each application of the basecoat and clearcoat.

Not only water-thinnable basecoats but also basecoats based on organic solvents can be used. Suitable basecoats are described in, for example, EP 0 692 007 A1 and in the documents listed therein at column 3, lines 50 et seq. Preferably, the applied basecoat is first dried—that is, in an evaporation phase, at least some of the organic solvent and/or of the water is removed from the basecoat film. Drying takes place preferably at temperatures from room temperature (20° C.) to 80° C. After drying has taken place, the coating composition of the invention is applied. The two-coat finish is subsequently baked, preferably under conditions employed in automotive OEM finishing, at temperatures from 20 to 200° C.; preferably from 60 to 150° C., for a time of 1 min up to 10 h; in the case of the temperatures employed for automotive refinishing, which in general are between 20 and 80° C., more particularly between 20 and 60° C., longer cure times may also be employed.

In another preferred embodiment of the invention, the coating composition of the invention is used as a transparent clearcoat for the coating of plastics substrates, particularly of plastics parts for interior or exterior installation. The plastics parts for interior or exterior installation are preferably coated likewise in a multistage coating process, in which an optionally precoated substrate or a substrate which has been pretreated for enhanced adhesion of the subsequent coatings (by means, for example, of flaming, corona treatment or plasma treatment of the substrate) is coated first with a pigmented basecoat film and thereafter with a film with the coating composition of the invention.

The Use of the Coating of the Invention

The present invention further relates to the use of the coating composition of the invention for improving the soiling resistance and the (self-)cleaning properties of coatings, particularly of clearcoat coatings.

For the purposes of this invention, the term "soiling resistance" refers to the capacity of a coating to repel dirt. These dirt-repelling coatings (often also referred to as easy-to-clean coatings) refer, in the present invention as in the literature, to coatings with surfaces to which dirt, dust, and contaminants, such as graffiti, industrial soiling, traffic soiling, and natural deposits, for example, exhibit little or no adhesion, and which are therefore easy to clean.

Furthermore, for the purposes of this invention, the term "(self-)cleaning property" refers both to the self-cleaning property and to the cleaning property of a surface, here specifically the surface of a coating. With self-cleaning, the cleaning involved is the simple cleaning of a soiled surface by being rained on, as will occur inevitably from time to time under real-life conditions. In the case of actual cleaning, tools such as brushes, sponges, (high-)pressure cleaners, for example, or other customary cleaning utensils are also used to reduce the soiling.

In general, for this purpose, the surface of a coating is designed such that its properties include that of repelling water. To put it another way, this means that there is low wetting as a result of extremely low interaction between the coating surface and water to which it is exposed, thereby developing an extremely large contact angle between the surface of the coating and a drop of water lying on the coating surface. The aim is for a condition of minimal surface area and surface energy.

The surface energy (a) here (abbreviated from surface energy density, surface tension) is a tension which acts on the surface and which always tends toward minimizing the surface area. The surface energy is therefore a form of work relative to area, and its unit is N/m or J/m$^2$.

The respective contact angle can be determined for a simple comparison of two different sample surfaces. The contact angle (wetting angle or marginal angle) (0) comes about between the margin of the drop and the surface when a drop of liquid on a planar solid or liquid surface persists in a spherical form which is easily deformed by gravity. It is a state of minimum of surface area and surface energy. The contact angle is expressed in °. From the contact angle it is possible, according to Young's equation, of which the skilled person is aware, to calculate the surface energy (for measurement method, see Examples).

The coating produced from the coating composition of the invention preferably possesses a surface energy<25 mJ/m$^2$, very preferably <22.5 mJ/m$^2$, and more especially preferably <22 mJ/m$^2$.

The formulation of coating compositions, with addition of compounds to lower the surface energy, often results in a poor-quality appearance of the resultant coating. The appearance of or visual impression given by a surface encompasses qualities including color, gloss, definition, haze, surface texture, structure, orange peel, pinholes and/or craters. In particular, haze—a milky cloudiness (opalescence)—and craters—small, round indentations in a coating which remain after drying/curing—are unwanted in coatings, particularly so in clearcoat coatings. Craters may go down into lower layers of a coating or down to the substrate, and are caused by locally limited irregularities in the surface tension of the coating. The most common causes of haze and craters are the incompatibility of components in the coating composition (binders, additives) with substances such as small oil drops, particles or contaminants. Particularly with coating compositions which lead to a water-repellent coating, an at least partial incompatibility with hydrophobic building blocks is observed.

At any rate, the appearance of a coating is often cloudy as a result of at least partial incompatibility of the added components, such as, for example, hydrophobic fluorine-containing components, on the one hand, and the binders used in the coating composition, on the other.

The soiling resistance and also (self-)cleaning properties of the coatings produced from the coating compositions of the invention were examined by a soiling test, by statement of the colorimetric lightness value L*, with which the skilled person is familiar (for measurement method, see Examples section).

From the change in the lightness ($L^*_1$) before soiling of the coating relative to the lightness after soiling ($L^*_2$), or after soiling and cleaning of the coating ($L^*_3$), it is possible to determine the soiling resistance and also the (self-)cleaning property of the coating. The smaller the change (delta, Δ) in the lightness (ΔL*), the lower the soiling ($\Delta L^*_{1-2}$) and the better the cleaning of the surface ($\Delta L^*_{1-3}$). Ideally, therefore, the ΔL* would amount to "zero", whereby dirt would not adhere at all or the cleaning of the coating would re-establish the original value.

The soiling resistances of the coatings which can be produced from the coating composition of the invention, expressed by the change in the lightness L* before and after soiling, are preferably $\Delta L^*_{1-2}<30$, more preferably $\Delta L^*_{1-2}<25$.

The (self-)cleaning properties of coatings which can be produced from the coating composition of the invention, expressed by the change in the lightness L* before and after soiling and cleaning, are preferably $\Delta L^*_{1-3}<20$, more preferably $\Delta L^*_{1-3}<10$, and very preferably $\Delta L^*_{1-3}<5$.

Examples

Measurement Method
Determination of Solids Content

Approximately 1 g of sample is weighed out into a tinplate lid. Following addition of about 3 ml of butyl acetate, the sample is dried in a drying cabinet at 130° C. for 60 minutes, cooled in a desiccator, and then reweighed. The residue corresponds to the solids content.

Determination of Binder Fraction

Binder fraction (also called binder content) is in each case the fraction of the coating composition prior to crosslinking that is soluble in tetrahydrofuran (THF). For this purpose a small sample (P) is weighed out, dissolved in 50 to 100 times the amount of THF, insoluble constituents are removed by filtration, the THF is evaporated off, and then the mass of the previously THF-dissolved constituents is ascertained by drying at 130° C. for 60 minutes, cooling in a desiccator, followed by renewed weighing. The residue corresponds to the binder fraction of the sample (P) and is expressed in wt %.

Glass Transition Temperature and Crosslinking Density

The glass transition temperature Tg of individual binder constituents, especially of the hydroxyl group-containing compound (A), is determined for the purposes of the invention experimentally in accordance with DIN 51005 "Thermal Analysis (TA)—terms", and DIN EN ISO 11357-2 "Thermal Analysis—Dynamic Scanning Calorimetry (DSC)". Here, a sample of 10 mg is weighed out into a sample boat and introduced into a DSC instrument. Cooling takes place to the start temperature, after which 1st and 2nd measuring runs are carried out with inert gas blanketing ($N_2$) at 50 ml/min, with a heating rate of 10 K/min, with cooling back to the start temperature between the runs. Measurement takes place customarily in the temperature range from about 50° C. below the anticipated glass transition temperature to about 50° C. above the glass transition temperature. The glass transition temperature for the purposes of the present invention, in accordance with DIN EN ISO 11357-2, section 10.1.2, is that temperature in the 2nd measurement run at which half of the change in the specific heat capacity (0.5 delta cp) is reached. It is determined from the DSC diagram (plot of the heat flow against the temperature), and is the temperature at the point of intersection of the midline between the extrapolated baselines before and after the glass transition, and the measurement curve.

The glass transition temperature and the crosslinking density of a coating can be determined, as the skilled person is aware, by a dynamic mechanical thermal analysis (DMTA) (in accordance with DIN EN ISO 6721-1). The physical properties of the coating here are related to the structure of the crosslinked network of the coating composition.

Carrying out the measurements requires a free film. This is obtained by applying the coating composition to a propylene substrate, from which, after baking, a rectangular specimen of known thickness, length, and width is taken. This free film is clamped into a DMTA V from Rheometrics and is measured using a sinusoidal oscillation with a frequency of 1 Hz and an amplitude of 0.2% at a heating rate of 2° C./minute. The glass transition temperature (Tg) in this measurement method is recorded as the maximum of the loss factor tan 5 from loss modulus E" and storage modulus E', while the crosslinking density is reported as the minimum of the storage modulus E' at a temperature above the Tg.

Determination of Surface Energy

The surface energy or surface tension of cured coatings is determined by ascertaining the contact angle. Liquids of known surface energies are applied dropwise in defined volumes to the coating, and the angle between the liquid and the solid surface is measured using a DAS 10 contact angle measuring instrument from Krüss. From this figure the surface energy is calculated, employing the Kaelble approximation. The particular approximation method for use is dependent on the material from which the sample under investigation (the coating) is made.

As measuring liquids, 5 µl of double-distilled water, 5 µl of 1,5-pentanediol, 1.5 µl of diiodomethane, 5 µl of ethylene glycol, and 5 µl of glycerol were applied carefully to the surface of the coating, and the resulting contact angle was captured after 10 seconds. The measurements are carried out six times per measuring liquid, and the average is calculated.

Soiling and (Self-)Cleaning Test

The soiling resistance and the (self-)cleaning properties of the coating were investigated using a soiling test developed inhouse, involving a test suspension. Measured for this purpose was the colorimetric lightness L* of a sample panel before soiling ($L^*_1$), after soiling ($L^*_2$), and also after soiling and cleaning ($L^*_3$). The difference in the lightness values $\Delta L^*$ provides information on the soiling resistance and also on the effectiveness of the (self-)cleaning properties of the coating.

In the first step, the lightness L* ($L^*_1$) of a test panel coated with a white basecoat and the clearcoat under investigation was measured. All lightness measurements were made using a Byk-mac i spectrophotometer (measurement aperture 23 mm) from BYK i, with the L* value of the 45° angle being used for data collection.

A test suspension consisting of 0.5 wt % carbon black (from Holbein Works), 0.2 wt % of yellow ocher (from Holbein Works), 1.3 wt % of JIS Z 8901 dust (grade 8), and 98.0 wt % of water was applied to the sample in a circular pass (1 circular pass/s) using an Airspray gun (nozzle aperture 1.3 mm, compressed air $9.8 \times 10^4$ Pa, discharge rate 70±3 cm³/min, distance from sample 300 mm). The sample was then dried in a conditioning chamber at 90° C. for 10 minutes. The process of applying the test suspension and subsequent drying step was carried out 8 further times, within each case 5 circular passes (1 circular pass/s) being carried out per repetition. Thereafter the lightness L* of the soil test panel was captured ($L^*_2$).

Using a water-steam jet (compressed air $9.8 \times 10^6$ Pa, discharge rate 70±3 cm³/min), the test panel was cleaned in 10 circular passes (1 circular pass/s) and dried using compressed air. The lightness L* was measured again ($L^*_3$).

The difference in the lightnesses $\Delta L^*$, which can be formed from individual colorimetric lightness values $L^*_1$, $L^*_2$, and $L^*_3$, allows a comparison of the soiling resistances ($\Delta L^*_{1-2}$) and also of the effectivenesses of the (self-)cleaning properties ($\Delta L^*_{1-3}$) of the coatings investigated.

Preparation Example Polyacrylates (A1) and Polyacrylates (A2)

A double-walled 4 L stainless steel reactor, equipped with thermometer, anchor stirrer, 2 dropping funnels, and reflux condenser and heatable by means of oil circulation thermostat, is charged with a suitable organic solvent for the polymerization. One of the dropping funnels is charged with the monomer mixture in accordance with the details in table 1, and the second dropping funnel with the initiator solution, containing a suitable initiator (generally a peroxide). The initial charge is heated to a polymerization temperature of 140° C. When the polymerization temperature has been reached, the initiator feed is started first of all. 15 minutes after the start of the initiator feed, the monomer feed (duration: 240 minutes) is commenced. The initiator feed is adjusted such that it runs for a further 30 minutes after the end of the monomer feed. After the end of the initiator feed, the mixture is stirred at 140° C. for a further 2 hours and then cooled to room temperature. The reaction mixture is subsequently adjusted with organic solvent to the solids content indicated in table 1.

TABLE 1

Composition and characteristics of the polyacrylates (A1) and polyacrylate (A2)

| Component | Polyacrylate A1 Parts by weight | Polyacrylate A2 Parts by weight |
|---|---|---|
| Styrene | 8.0 | |
| n-Butyl methacrylate | 8.0 | |
| Acrylic acid | 0.6 | |
| 4-Hydroxybutyl acrylate | 12.0 | |
| 2-Hydroxyethyl acrylate | 12.0 | 22 |
| n-Butyl acrylate | 19.0 | |
| Ethylhexyl acrylate | | 38 |
| Solids content 1 h 150° C. | 65% | 65% |
| Acid number [mg KOH/g] | 8-12 | 0-3 |
| OH number [mg KOH/g] | 175 | 175 |
| Tg [° C.][1] | −13 | −45 |

Key to table 1:
[1]The glass transition temperature Tg was measured by means of the above-described DSC measurements in accordance with DIN EN ISO 11357-2.

Calculation of Example of Base Varnishes (S1) and (S2)

To prepare the base varnishes (S1) and (S2), the components listed in table 2 were weighed out in the specified order in a suitable vessel and stirred intimately with one another.

TABLE 2

Composition of base varnishes (S1) and (S2)

| Component | Base varnish S1 Parts by weight | Base varnish S2 Parts by weight |
|---|---|---|
| Polyacrylate A1 | 75 | 40 |
| Polyacrylate A2 | | 35 |
| Tinuvin 384[1] | 1.5 | 1.5 |
| Tinuvin 292[2] | 1.5 | 1.5 |
| Byk 325[3] | 0.2 | 0.2 |
| Butyl acetate | 19.5 | 19.5 |
| Nacure 4167[4] | 2.3 | 2.3 |

Key to table 2:
[1]Tinuvin ® 384 = commercial light stabilizer based on a benzotriazole, from BASF S.E.
[2]Tinuvin ® 292 = commercial light stabilizer based on sterically hindered amine, from BASF S.E.
[3]Byk 325 = commercial polyether-modified polymethylalkylsiloxane, from Byk Chemie
[4]Nacure ® 4167 = commercial catalyst based on an amine-blocked phosphoric acid partial ester, from King Industries, nonvolatile fraction 25%

Preparation Example of Curing Agents (H1) to H4)

The protocol below applies to the preparation of curing agents (H1) to (H4). It is implemented along the lines of the protocol from WO2012/168014 A1, page 32, lines 4-27, here explicitly for the curing agent (H1). The corresponding proportions and components for the curing agents (H2) to (H4) can be taken from table 3.

A reaction vessel is charged with 39 parts by weight of trimerized hexamethyl 1,6-diisocyanate (Desmodur® N3300, from Covestro) and 36 parts by weight of butyl acetate. With reflux cooling, nitrogen blanketing, and stirring, a mixture of 2.0 parts by weight of N-[3-(trimethoxysilyl)propyl]butylamine (Dynasylan® 1189, from Evonik) and 20 parts by weight of bis[3-(trimethoxysilyl)propyl]amine (Dynasylan® 1124, from Evonik) is added dropwise at a rate such that the temperature does not exceed 50-60° C. The reaction mixture is stirred until the NCO value determined by titration has reached the NCO value of 5.9 wt % calculated theoretically for complete reaction of the amines containing silane groups. Then 3.0 parts by weight of trimerized isophorone diisocyanate (Desmodur® Z4470, 70% in solvent naphtha, from Covestro) are added. The resulting mixture has a NCO value of 6.1 wt % and a theoretical solids content of 63 wt %.

TABLE 3

Composition of curing agents (H1) to (H4)

| Component | Curing agent (H1) | Curing agent (H2) | Curing agent (H3) | Curing agent (H4) |
|---|---|---|---|---|
| | Parts by weight | | | |
| Desmodur ® N3300 | 39 | 26 | 25 | 41 |
| Butyl acetate | 36 | 6 | 7 | 36 |
| Dynasylan ® 1189 | 2 | | | 2 |
| Dynasylan ® 1124 | 20 | | | 20 |
| Desmodur ® Z4470 | 3 | | 3 | |
| NCO value (wt %) | 6.1 | 17.7 | 16.6 | 6.2 |
| Solids content (theoretically) (wt %) | 63 | 81.3 | 77.4 | 63.6 |

Formulation of Inventive Coating Composition EB1 and of Comparative Coating Compositions VB1 to VB11, and of the Coatings Produced Therefrom of Inventive Example E1 and of Comparative Examples V1 to V11.

To produce the coating compositions, base varnish (S1) or (S2), with or without addition of the alkoxysilyl-functional siloxane (D) or inventive use or of a comparative siloxane (hydroxy-functional siloxane), are stirred intimately in a suitable vessel with one of the curing agents (H1) to (H4) at 1:1 (m:m). By appropriate combination of base varnish (S1) and (S2) with one of the curing agents (H1) to (H4), coatings with a high or low crosslinking density and high or low Tg are obtained from the corresponding coating compositions EB1 and VB1 to VB11. The inventive coating composition EB1, produced from base varnish (S1) and curing agent (H1), with addition of an alkoxysilyl-functional siloxane to the base varnish (S1), possesses a high crosslinking density and a high Tg. The constitutions of the coating compositions are set out in table 4.

TABLE 4

Constitution of coating compositions EB1 and VB1 to VB11 and data relating to glass transition temperature (Tg) and crosslinking density or the coatings E1 and V1 to V11 produced in the coating compositions

| Component | Base varnish | KR-410[1] | KF-6000[2] | Curing agent | Tg (° C.)[3] | Crosslinking density (Pa) *10^7[4] |
|---|---|---|---|---|---|---|
| High Tg, high crosslinking density: | | | | | | |
| VB1 | S1 | | | H1 | 83 | 4.9 |
| EB1 | S1 | 0.5 | | H1 | 83 | 4.9 |
| VB2 | S1 | | 0.5 | H1 | 83 | 4.9 |

TABLE 4-continued

Constitution of coating compositions EB1 and VB1 to VB11 and data relating to glass transition temperature (Tg) and crosslinking density or the coatings E1 and V1 to V11 produced in the coating compositions

| Component | Base varnish | KR-410[1] | KF-6000[2] | Curing agent | Tg (°C.)[3] | Crosslinking density (Pa) *10^7[4] |
|---|---|---|---|---|---|---|
| Low Tg, low crosslinking density: | | | | | | |
| VB3 | S2 | | | H2 | 59 | 2.0 |
| VB4 | S2 | 0.5 | | H2 | 59 | 2.0 |
| VB5 | S2 | | 0.5 | H2 | 59 | 2.0 |
| High Tg, low crosslinking density: | | | | | | |
| VB6 | S1 | | | H3 | 79 | 2.0 |
| VB7 | S1 | 0.5 | | H3 | 79 | 2.0 |
| VB8 | S1 | | 0.5 | H3 | 79 | 2.0 |
| Low Tg, high crosslinking density: | | | | | | |
| VB9 | S2 | | | H4 | 62 | 5.2 |
| VB10 | S2 | 0.5 | | H4 | 62 | 5.2 |
| VB11 | S2 | | 0.5 | H4 | 62 | 5.2 |

Key to table 4:
[1] KR-410 = linear alkoxysilyl-functional siloxane, from Shin-Etsu
[2] KF-6000 = linear hydroxy-functional siloxane, from Shin-Etsu
[3] Tg = glass transition temperature, measured by means of DSC measurements in accordance with DIN EN ISO 11357-2
[4] Crosslinking density, measured by XLD. Reported value corresponds to E'min.

The coatings of examples E1 and V1 to V11 are obtained from the coating compositions EB1 and VB1 to VB11 by application using a gravity-fed cup-type gun to 40×40 cm Bonder panels, coated beforehand with a cured black aqueous basecoat material, after baking for 20 minutes at 140° C., in a target dry film thickness of 35-45 μm.

The surface of the coatings was assessed by measurement of the gloss of an angle of 20° using a commercial gloss device and by visual inspection for defects (craters for example) and appearance.

The scratch resistance of the dry surfaces of the resultant coatings was determined by means of the Crockmeter test, in accordance with EN ISO 105-X12 with double rubs and 9 N applied force, using 9 μm sandpaper (3M™ Wetordry™ 281Q), with subsequent determination of the residual gloss at 20° using a commercial gloss device, without reflow.

The resistance of a coating to cracking and/or delamination from a metallic substrate is determined by a cupping test in accordance with DIN EN ISO 1520, and thus represents a measure of the flexibility of the coating. The depth of penetration is expressed in mm and in the OEM sector ought to above 6 mm.

The soiling resistance and the (self-)cleaning properties and also the surface energy of the coatings were determined in the manner described earlier on above. Reported here are the change in the colorimetric lightness $L^*_1$ before soiling relative to the lightness $L^*_2$ after soiling ($\Delta L^*_{1-2}$), and the change in the colorimetric lightness $L^*_1$ before soiling relative to the coating cleaned with a steam jet after having been soiled beforehand, $L^*_3$ ($\Delta L^*_{1-3}$).

The results of the tests on the coatings E1 and V1 to V11 are set out in table 5.

TABLE 5

Results of scratch resistance, of cupping, of soiling properties and (self-)cleaning properties and also of the surface energy of coatings E1 and V1 to V11.

| Ex. | Craters/surface defects | Gloss 20° | Residual gloss 20° (%) | Cupping (mm) | $\Delta L^*_{1-2}$ | $\Delta L^*_{1-3}$ | Surface energy (mJ/m²) |
|---|---|---|---|---|---|---|---|
| High Tg, high crosslinking density: | | | | | | | |
| V1 | OK | 88 | 73 | 6.3 | 41.3 | 5.0 | 39.1 |
| E1 | OK | 86 | 77 | 6.6 | 22.9 | −0.7 | 21.0 |
| V2 | OK | 86 | 71 | 6.6 | 27.6 | 1.8 | 23.3 |
| Low Tg, low crosslinking density: | | | | | | | |
| V3 | OK | 87 | 40 | 7.7 | 83.4 | 13.3 | 37.5 |
| V4 | OK | 85 | 44 | 7.5 | 70.9 | 3.9 | 20.3 |
| V5 | OK | 87 | 39 | 7.6 | 68.3 | 9.6 | 22.6 |
| High Tg, low crosslinking density: | | | | | | | |
| V6 | OK | 88 | 35 | 7.2 | 53.8 | 3.9 | 41.6 |
| V7 | OK | 85 | 40 | 7.0 | 48.3 | 1.6 | 22.4 |
| V8 | OK | 86 | 34 | 7.0 | 75.9 | 4.9 | 24.0 |
| Low Tg, high crosslinking density: | | | | | | | |
| V9 | OK | 89 | 77 | 6.4 | 75.2 | 5.2 | 38.7 |
| V10 | OK | 87 | 78 | 6.6 | 57.6 | 0.1 | 20.9 |
| V11 | OK | 87 | 75 | 6.4 | 58.3 | 3.7 | 27.2 |

Investigated additionally were the soiling resistance and the (self-)cleaning properties and also the surface energy of the examples with high Tg and high crosslinking density (E1, V1, and V2) after weathering exposure. For this purpose the sample panels with the coatings E1, V1, and V2 were exposed to weathering in a direct placement (outdoor weathering) at an angle of 5° over 4 months. The investigations for soiling resistance, (self-)cleaning, and surface energy were then carried out once again for these sample panels. The results are set out in table 6.

TABLE 6

Results of the soiling and (self-)cleaning properties and also of the surface energy of coatings E1, V1, and V2 after 4-month outdoor weathering.

| Ex. | $\Delta L^*_{1-2}$ | $\Delta L^*_{1-3}$ | Surface energy (mJ/m$^2$) |
|---|---|---|---|
| V1 | 54.7 | 10.0 | 41.3 |
| E1 | 38.9 | 6.1 | 26.1 |
| V2 | 52.7 | 8.9 | 39.2 |

The results emphasized that only the inventive coating composition EB1 leads to a coating E1 which possesses excellent soiling resistance, good (self-)cleaning properties, even after weathering exposure, and good flexibility, without any detriment to the scratch resistance or the visual impression given by the coating.

Surprisingly it was found that a general lowering of the surface energy is not enough to obtain the excellent soiling resistances of the coating E1, even after weathering exposure. Indeed, as demonstrated by the soiling resistances of comparative coatings V4, V7, and V10 with alkoxysilyl-functional siloxane or of comparative coatings V2, V5, V8, and V11 with hydroxy-functional siloxane, simply lowering the surface energy of the coating is not sufficient to give the excellent soiling resistances and (self-)cleaning properties of the coating E1.

Looking at the soiling resistances, in other words comparing the lightness values L* before and after soiling ($\Delta L^*_{1,2}$), a significantly better behavior is apparent for the coatings modified with alkoxysilyl-functional siloxanes (table 5, E1, V4, V7, V10) relative to the coatings modified with hydroxy-functional siloxanes (table 5, V2, V5, V8, V11), and especially relative to unmodified coatings (table 5, V1, V3, V6, V9).

It is further apparent that only a high crosslinking density and a high Tg, with or without addition of a noninventive siloxane, are not enough to achieve the excellent results of the inventive example (compare example E1 with V1 and V2, table 5, table 6).

Across all of the examples, then, it is evident that only the combination of addition of an alkoxysilyl-functional siloxane and a sufficiently high fraction of binders with high Tg leads to coating compositions and to coatings which in addition to obtaining requirements imposed fundamentally on clearcoats, also possess an excellent soiling resistance.

The (self-)cleaning properties of the coating E1, expressed by way of the value ($\Delta L^*_{1-3}$), are likewise excellent, and again very good results were obtained with coatings which possess a high Tg and low crosslinking density or a low Tg with high crosslinking density (cf. table 5, V7 and V10). However, these coatings exhibit soiling resistances which are significantly deserving of improvement. In the inventive example E1, the difference in lightness before and after cleaning ($\Delta L^*_{1-3}$) is actually negative, which would suggest that the sample panel had a greater lightness after cleaning than before soiling. This difference may point to a slight contamination of the sample panel, with dust or fingerprints, for example, before the deliberate soiling of the sample panel.

Only the inventive coating E1 retains—even after weathering exposure—excellent soiling resistance and good (self-)cleaning properties, which, although somewhat lower than before the weathering exposure, are nevertheless still significantly ahead of the comparative coatings in terms of quality, particularly with regard to soiling. In contrast, the advantageous properties of the noninventive, hydroxy-functional siloxane in terms of soiling resistance and (self-)cleaning relative to unmodified coatings are forfeited after weathering exposure (compare table 6, V1 and V2).

The invention claimed is:

1. A nonaqueous coating composition comprising:
   (A) at least one hydroxyl group-containing compound (A) having a hydroxyl number of 100 to 400 mg KOH/g and a Tg>−35° C., which is present at not less than 25 wt %, based on the binder fraction of the coating composition,
   (B) at least one isocyanate group-containing compound (B) having free or blocked isocyanate groups, compound (B) comprising at least one structural unit of the formula (I)

   —NR—(X—SiR''$_x$(OR')$_{3-x}$)          (I), and/or at least one structural unit of the formula (II),

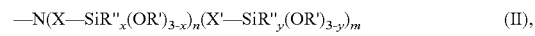
   —N(X—SiR''$_x$(OR')$_{3-x}$)$_n$(X'—SiR''$_y$(OR')$_{3-y}$)$_m$          (II), where
   R=hydrogen, alkyl, cycloalkyl, aryl, or aralkyl, it being possible for the carbon chain to be interrupted by nonadjacent oxygen, sulfur, or NRa groups, with Ra=alkyl, cycloalkyl, aryl, or aralkyl,
   R'=hydrogen, alkyl, or cycloalkyl, it being possible for the carbon chain to be interrupted by nonadjacent oxygen, sulfur, or NRa groups,
   X, X'=linear and/or branched alkylene or cycloalkylene radical having 1 to 20 carbon atoms,
   R''=alkyl, cycloalkyl, aryl, or aralkyl, it being possible for the carbon chain to be interrupted by nonadjacent oxygen, sulfur, or NRa groups,
   n=0 to 2, m=0 to 2, m+n=2, and x, y=0 to 2,
   and
   (C) at least one catalyst (C) for the crosslinking of silane groups,
   wherein additionally there is
   (D) at least one alkoxysilyl-functional siloxane of the formula (III)

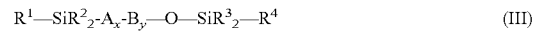
   R$^1$—SiR$^2_2$-A$_x$-B$_y$—O—SiR$^3_2$—R$^4$          (III)

in which
   A is a group —[O—SiR$^5_2$]— and B is a group —[O—SiR$^6$R$^7$]—,
   R$^2$, R$^3$, R$^5$, and R$^6$ independently of one another are linear or branched alkyl groups having 1 to 4 carbon atoms,
   R$^1$, R$^4$, and R$^7$ independently of one another are a group -L-R$^8$,
   in which L=a linear or branched divalent alkyl group and R$^8$=H or —Si(R$^9$)$_z$(OR$^{10}$)$_{3-z}$ with R$^9$, R$^{10}$=a linear or branched alkyl group having 1-4 carbon atoms and z=0, 1, or 2,
   with the proviso that at least one of the radicals R$^1$ or R$^4$ and/or at least one group B constitutes a group R$^8$=—Si(R$^9$)$_z$(OR$^{10}$)$_{3-z}$, x independently is an integer of 1-20, y independently is an integer of 0-10.

2. The coating composition as claimed in claim 1, which is a two-component coating composition, wherein the alkoxysilyl-functional siloxane (D) and compound (A) are comprised in the same component.

3. The coating composition as claimed in claim 1, wherein $R^2$, $R^3$, and $R^5$ independently of one another are a methyl and/or ethyl, $R^1$ and $R^4$ independently of one another are a group -L-$R^8$, in which L=a linear or branched divalent alkyl group, and $R^8$=—Si($R^9$)$_z$(O$R^{10}$)$_{3-z}$ with $R^9$, $R^{10}$=a linear or branched alkyl group having 1-4 carbon atoms and z=0, 1, or 2, and y=0.

4. The coating composition as claimed in claim 3, wherein the divalent alkyl group is ethylene.

5. The coating composition as claimed in claim 1, containing no fluorine-containing compounds which lead to hydrophobation of the coating resulting therefrom.

6. The coating composition as claimed in claim 1, comprising as polyhydroxyl group-containing compound (A) at least one poly(meth)acrylate resin having an OH number of 100 to 300 mg KOH/g, and a glass transition temperature of −35 to 100° C., (measured by means of DSC measurements in accordance with DIN EN ISO 11357-2).

7. The coating composition as claimed in claim 6, wherein the at least one poly(meth)acrylate resin has an OH number of 150 to 200 mg KOH/g.

8. The coating composition as claimed in claim 1, comprising at least one phosphorus- and nitrogen-containing catalyst (C).

9. The coating composition as claimed in claim 1, wherein the compound (B) has been prepared by reacting polyisocyanates and/or their isocyanurate trimers and/or their allophanate dimers and/or their biuret dimers and/or uretdione dimers with at least one compound of the formula (Ia)

H—NR—(X—SiR"$_x$(OR')$_{3-x}$)    (Ia)

and/or at least one compound of the formula (IIa),

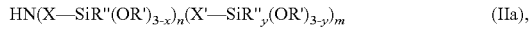

HN(X—SiR"(OR')$_{3-x}$)$_n$(X'—SiR"$_y$(OR')$_{3-y}$)$_m$    (IIa), where the substituents have the definition stated in claim 1.

10. A method for producing coatings by applying to an optionally precoated substrate the coating composition as claimed in claim 1.

11. The method as claimed in claim 10, which is used for producing a coating for automotive OEM finishing, the finishing of parts for installation in or on automobiles, and/or the finishing of commercial vehicles, and or automotive refinishing.

12. A coating produced by a method as claimed in claim 10.

13. The coating as claimed in claim 12, which possesses a glass transition temperature (Tg)>70° C. and a crosslinking density>3.0×$10^7$ Pa.

14. A method for producing coatings, wherein a pigmented basecoat material and thereafter the coating composition as claimed in claim 1 are applied to an optionally pretreated and optionally precoated substrate.

15. The method as claimed in claim 14, wherein following application of the pigmented basecoat, the applied basecoat material is first dried at temperatures of 20 to 80° C. and, following application of a nonaqueous coating composition comprising:

(A) at least one hydroxyl group-containing compound (A) having a hydroxyl number of 100 to 400 mg KOH/g and a Tg>−35° C., which is present at not less than 25 wt %, based on the binder fraction of the coating composition, (B) at least one isocyanate group-containing compound (B) having free or blocked isocyanate groups, compound (B) comprising at least one structural unit of the formula (I)

—NR—(X—SiR"$_x$(OR')$_{3-x}$)    (I), and/or at least one structural unit of the formula (II),

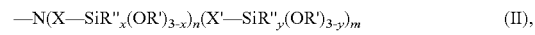

—N(X—SiR"$_x$(OR')$_{3-x}$)$_n$(X'—SiR"$_y$(OR')$_{3-y}$)$_m$    (II), where

R=hydrogen, alkyl, cycloalkyl, aryl, or aralkyl, it being possible for the carbon chain to be interrupted by nonadjacent oxygen, sulfur, or NRa groups, with Ra=alkyl, cycloalkyl, aryl, or aralkyl, R'=hydrogen, alkyl, or cycloalkyl, it being possible for the carbon chain to be interrupted by nonadjacent oxygen, sulfur, or NRa groups, X, X'=linear and/or branched alkylene or cycloalkylene radical having 1 to 20 carbon atoms, R"=alkyl, cycloalkyl, aryl, or aralkyl, it being possible for the carbon chain to be interrupted by nonadjacent oxygen, sulfur, or NRa groups, n=0 to 2, m=0 to 2, m+n=2, and x, y=0 to 2, and (C) at least one catalyst (C) for the crosslinking of silane groups, wherein additionally there is (D) at least one alkoxysilyl-functional siloxane of the formula (III)

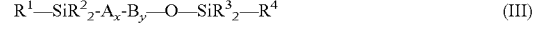

$R^1$—Si$R^2_2$-A$_x$-B$_y$—O—Si$R^3_2$—$R^4$    (III)

in which

A is a group —[O—Si$R^5_2$]—and B is a group —[O—Si$R^6R^7$]—, $R^2$, $R^3$, $R^5$, and $R^6$ independently of one another are linear or branched alkyl groups having 1 to 4 carbon atoms, $R^1$, $R^4$, and $R^7$ independently of one another are a group -L-$R^8$, in which L=a linear or branched divalent alkyl group and $R^8$=H or —Si($R^9$)$_z$(O$R^{10}$)$_{3-z}$ with $R^9$, $R^{10}$=a linear or branched alkyl group having 1-4 carbon atoms and z=0, 1, or 2, with the proviso that at least one of the radicals $R^1$ or $R^4$ and/or at least one group B constitutes a group $R^8$=—Si($R^9$)$_z$(O$R^{10}$)$_{3-z}$, x independently is an integer of 1-20, y independently is an integer of 0-10, is cured at temperatures of 20 to 200° C. during a time of one minute up to 10 hours.

16. A method of improving the soiling resistance and the (self-)cleaning properties of coatings by applying the coating composition as claimed in claim 1.

17. The coating as claimed in claim 12, which possesses a soiling resistance of ΔL*$_{1-2}$<30, where ΔL*$_{1-2}$ defines the difference in the colorimetric lightness L* before (L*$_1$) and after (L*$_2$) soiling of a sample panel on which the coating composition has been applied and cured.

18. A multicoat effect and/or color coating comprising at least one pigmented basecoat and at least one clearcoat disposed thereon, wherein the clearcoat has been produced from the coating composition as claimed in claim 1.

19. The coating composition as claimed in claim 1, wherein, in formula (III), $x+y \leq 20$.

* * * * *